United States Patent [19]
Abramovitch

[11] Patent Number: 5,663,847
[45] Date of Patent: Sep. 2, 1997

[54] REJECTION OF DISTURBANCES ON A DISK DRIVE BY USE OF AN ACCELEROMETER

[76] Inventor: Daniel Y. Abramovitch, 3372 Kipling St., Palo Alto, Calif. 94306

[21] Appl. No.: 410,991

[22] Filed: Mar. 27, 1995

[51] Int. Cl.$^6$ .................................................. G11B 5/596
[52] U.S. Cl. ................ 360/77.02; 360/75; 360/78.09; 360/77.04
[58] Field of Search ..................... 360/75, 78.09, 360/78.04, 77.04, 77.02, 69, 31; 318/651; 369/247

[56] References Cited

U.S. PATENT DOCUMENTS

| | | | |
|---|---|---|---|
| 4,040,103 | 8/1977 | White | 360/75 |
| 4,862,298 | 8/1989 | Genheimer | 360/75 |
| 4,967,293 | 10/1990 | Aruga | 360/75 |
| 5,235,472 | 8/1993 | Smith | 360/60 |
| 5,299,075 | 3/1994 | Hanks | 360/77.02 |
| 5,325,247 | 6/1994 | Erlich et al. | 360/78.09 |
| 5,426,545 | 6/1995 | Sidman | 360/78.09 |
| 5,521,772 | 5/1996 | Lee | 360/75 |

FOREIGN PATENT DOCUMENTS

| | | |
|---|---|---|
| 0 264 535 A2 | 4/1988 | European Pat. Off. . |
| 192585 | 8/1991 | Japan ........................... 360/75 |

OTHER PUBLICATIONS

English Translation of Japan 1585., Aug. 22, (Nishimura) 1991.
"Adaptive Switching Circuits", by B. Widrow et al, 1960 IRE Weston Convention Record, pp. 96–104.
Adoptive Signal Processing, by B. Widrow et al, 1985, pp. 99–116.
David B. Davies, "Active Compensation of Shock, Vibration, and Wind–Up in disk Drives", ASME 1991 Winter Annual Meeting, Dec. 1991, pp. 1–16.

Primary Examiner—Andrew L. Sniezek
Assistant Examiner—Alan Faber

[57] ABSTRACT

A disk recording and/or reproduction device subject to shock and vibration. The track following function of the transducer is augmented by an acceleration responsive sensor. The acceleration responsive sensor is sampled at a different frequency than the sampling frequency of the head disk assembly position error signal. The variations in the gain of the acceleration responsive sensors can be compensated for in real time.

10 Claims, 10 Drawing Sheets

REJECTION OF DISTURBANCES ON A DISK DRIVE BY USE OF AN ACCELEROMETER

FIELD OF INVENTION

This invention relates generally to rejection controls of shock and vibration in disk recording and/or reproduction systems and more particularly to apparatus and controls for multiple sampling rates of the shock and vibration rejection control system.

BACKGROUND OF INVENTION

In a disk recording and/or reproduction system an objective of the servo system which controls the radial position of the transducer on the disk, is to keep the transducer over the center of a preselected track. In a disk file system, this is done as the transducer reads position information from a track in the surface of the disk as the disk rotates. For an embedded or sectored servo system the position information is obtained from inter sector information placed at predetermined locations on the tracks of the disk. This position information is then used to develop a position error signal. The error signal is then fed back through a compensator into the drive motor for the transducer actuator to move the transducer in a direction to reduce the error.

The servo system includes a feed back servo loop (head actuator loop). The position error signal is coupled into the head actuator loop. Because of the finite response time of the feed back servo loop in correcting for disturbances, these disturbances or displacements cannot be totally eliminated. To desensitize rotary actuator disk drives to translational disturbances, a balanced mechanical actuator has traditionally been used. However, since the actuator must pivot freely in order to access the data (as free as friction will allow) the effects of rotary disturbances about the axis normal to the disk surface can be considerable.

It has been proposed to use rotational accelerometers to sense rotational shock and vibration. The rotational accelerometers generate a signal which can be used as a feed forward controller to make the disk drive more robust to shocks and vibrations. There have been numerous publications on accelerometer feed forward algorithms, but the current use of accelerometers is limited to the role of a threshold detector for stopping writes of data to the disk. Such as, Hewlett Packard, HP Kittyhawk Personal Storage Modules Product Brief, 1993, and U.S. Pat. No. 5,235,472. More specifically, the accelerometer detects a threshold level of shock or vibration and prevents writes to the disk if the shock or vibration is greater than a predetermined amount.

The idea of using accelerometer signals to compensate for external shock and vibration of a disk drive is not new. As far back as 1977, White (U.S. Pat. No. 4,040,130) proposed a scheme to use accelerometers to minimize the possibility of the magnetic heads slapping against the magnetic media. Improved mechanics and stiffer air bearings have minimized the need for such a system. White proposed two modes of using accelerometers in disk drives. The first mode suggests using the accelerometer as a simple shock protection device. When the accelerometer detects a large enough shock, the magnetic heads are moved away from the disk to avoid possible head crashes. The second mode suggest using the accelerometer in a control loop. The effect of the shock on the head to disk spacing being actively minimized by feeding the accelerometer signal into a control loop. The vertical position of the head can be controlled by either changing the internal pressure of the drive and thus the air bearing stiffness, or by using a servomotor on the drive arm in the vertical direction.

More recently, the use of accelerometers for minimizing the effects of both seek reaction torque and external excitation has been studied by Davies and Sidman (D. B. Davies and M. D. Sidman, "Active compensation of shock, vibration, and wind-up disk drives," Advances in Information Storage Systems, Vol. 5, pp. 5–20, ASME Press, 1993). Their conclusions suggest analytically calculating a filter for filtering the accelerometer response such that the effect of both of the disturbances is zeroed. With some practical constraints, they derived a workable solution. However, their solution requires knowledge of parameters characteristic of the particular drive and accelerometer being used. This solution does not discuss accelerometer resonances in the servo bandwidth or noise. This would imply that they are using expensive high grade accelerometers. They use low pass filtering to limit the gain of the accelerometer loop at high frequencies to prevent unmodeled head disk assembly (HDA) dynamics from destabilizing the system. This can include HDA characteristics which were either unknown or ignored during the design of the system.

One of the main practical issues in disk drives is a continual push towards lowering the manufacturing cost. It is not practical to use expensive laboratory grade accelerometers in the manufacture of low cost disk drives. In the work of Knowles and Hanks ("Shock and vibration disturbance compensation system for disk drives," European Patent Application 871065555.3), a linear accelerometer was used to minimize the effect of translational shock on the position error signal. The accelerometer was mounted directly on the HDA so that both internally and externally produced disturbances could be sensed. However, each of the accelerometers had to be calibrated in the drive during manufacturing, and as a result, the drive costs more to manufacture. More recently, the work of Hanks (U.S. Pat. No. 5,299,075) has shown how to calibrate accelerometers while they are still in operation. This allows less expensive accelerometers to be used and reduces the manufacturing times.

Small disk drives face several problems that have yet to become major issues for large disk drives. Small disk drives are inherently designed for portable applications. In a mobile environment, the disk drive must tolerate much more severe shock and vibration than is experienced in the traditional disk drive environment.

Small disk drives have less surface area available for storing information. To preserve disk surface area for storing data, the inter sector position information locations (also known as servo bursts) are reduced in number. Therefore, the number of inter sector locations on a given track of the disk is reduced. This provides more disk space for storing information, but also reduces the rate at which the head actuator loop receives head position correction information. Generally, the result is that the sampling rate of the head actuator loop is reduced. The reduction in sampling rate often limits the close loop bandwidth, which in turn can adversely effect the drives disturbance refection ability. This makes the head actuator loop susceptible to mechanical shock and vibration.

Portable electronic devices are becoming more popular. Many of these portable electronic devices require small disk drives. With the increasing demand for smaller disk drive systems which operate at lower servo loop sampling rates, there exists a need for higher performance shock and vibration correction systems.

SUMMARY

This invention improves the shock and vibration tolerance of disk drives. This invention uses at least one accelerometer to reject both internal and external disturbances in a disk drive. The limited sample rate of the nominal position (head actuator) feedback loop is increased or decreased by sampling an accelerometer signal feed forward loop at a different rate. In another words, the accelerometer output signal can be sampled at a rate different (typically higher) than the nominal position feedback loop. This allows for broadening of the shock and vibration correction bandwidth, which reduces the phase shift of the accelerometer response filtering and increases the design freedom of the accelerometer feed forward loop.

In order to compensate for the highly variable gain of the accelerometer, the accelerometer filter gain can be adapted. Essentially, the gain of the accelerometer filter is adjusted automatically to compensate for the variability of the accelerometer gain. Real time adjustments in the gain of the accelerometer filter will compensate for drift in circuit components of the correction system. The adaptation can include a threshold scheme which shuts the adaptation off if the disk drive is not experiencing any acceleration. Therefore, when the disk drive is not subjected to mechanical shock or vibration, the adaptation is automatically turned off. This will prevent the accelerometer filter from being adjusted to adapt to an accelerometer signal that is composed primarily of noise.

BRIEF DESCRIPTION OF DRAWINGS

The invention will be better understood by reference to the following specification when considered in conjunction with the accompanying drawings in which.

DETAILED DESCRIPTION

Figure 1:
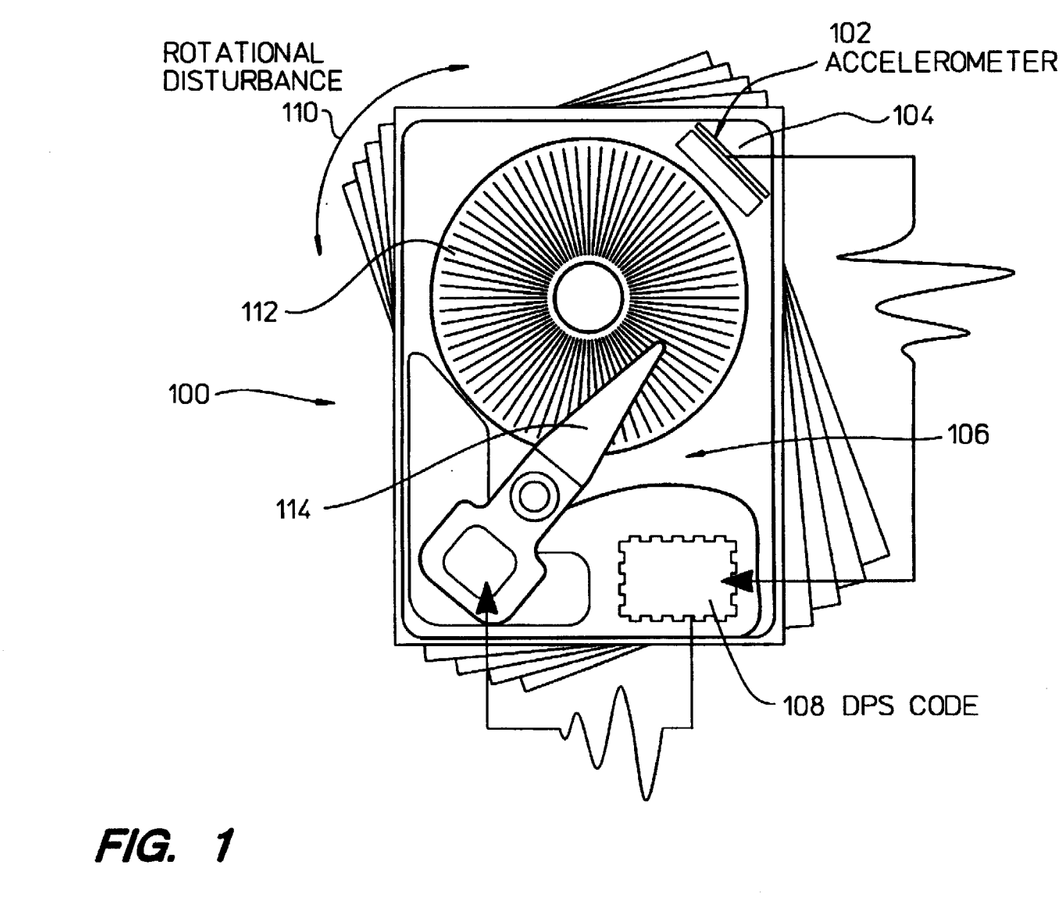
FIG. 1 is a pictorial view of a small disk drive shaking rotationally.

FIG. 1 shows a conceptual view of a small disk drive assembly 100 being shaken rotationally. An accelerometer 102 is mounted on the drive base plate 104 so that it may sense the motion of the head disk assembly (HDA) 106. The output of the accelerometer 102 is sampled and digitally processed by a digital signal processor 108. The digitally processed accelerometer output signal helps to control the positioning of the actuator arm 114. The accelerometer 102 will sense the rotational motion 110 in the plain of the disk 112 of the disk drive assembly 100.

The rotational accelerometer 102 is mounted on the drive base plate 104 rather than the actuator arm 114 so that the accelerometer 102 can sense the motion of the HDA 106 of the disk drive. The actuator 114 is essentially floating free from the HDA 106. The nominal drive feedback loop acts to position the read/write transducer (also called the read/write head) which is located at the end of the actuator 114, over the desired position on the disk 112. Henceforth, the transducer and the actuator will be considered together and referred to as the actuator. When the HDA 106 is bumped rotationally in the plane of the disk 112, the actuator 114 will retain its position in inertial space and a position error will result. The drive feedback loop can reject some of the disturbance and maintain the correct position. However, a significant amount of disturbance will not be corrected if the feedback loop gain is not great enough. Furthermore, the phase lag or time delay of the feed back loop diminishes the cancellation ability of the drive because the loop bandwidth is limited. However, by summing the accelerometer signal into the drive feed back loop with the proper gain and phase, the effect of the disturbance on the position error between the disk track and the read/write head on the actuator 114 can be reduced.

Figure 2A:
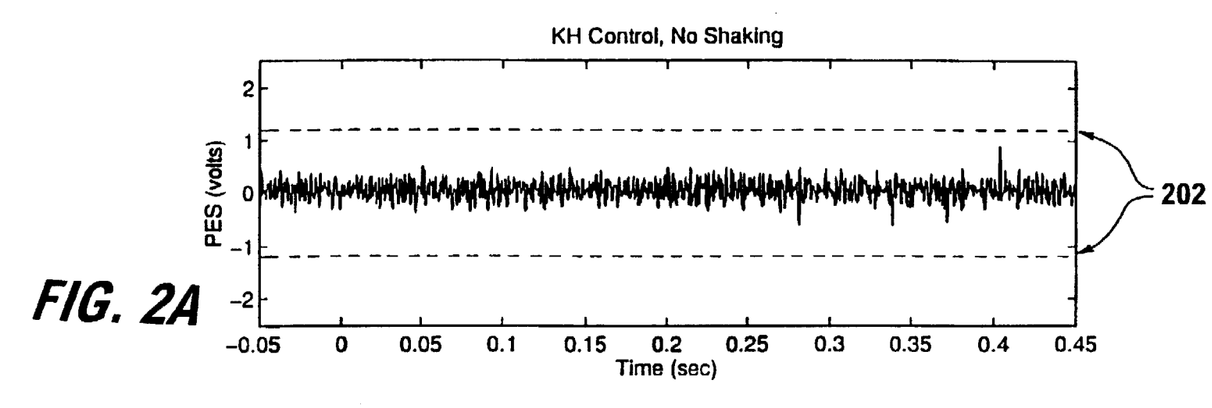
FIGS. 2A and 2B are plots of the position error signal of a disk drive with and without external vibration.
Figure 2B:
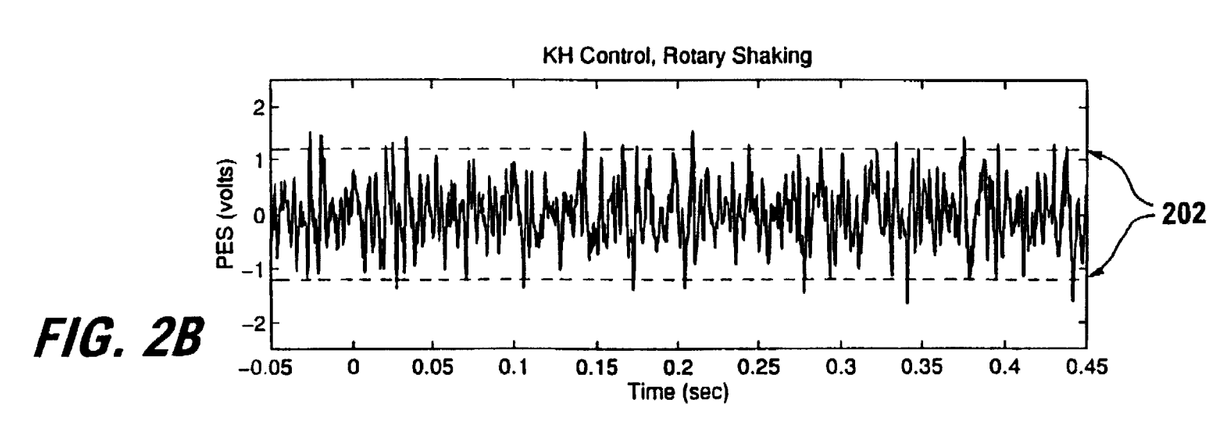

FIGS. 2A and 2B show the results of an actual experiment on a disk drive assembly being shaken with a random rotary vibration in the frequency range of 50 to 500 Hz. The FIG. 2A depicts the position error signal (PES) when the disk drive is not subjected to any external shaking. FIG. 2B depicts the PES when the disk drive is subjected to vibration. The vibration has frequency components varying from 50 Hz to 500 Hz, and a vibrational amplitude of 86.5 radians/second-second. The dashed lines 202 represent the signal level of the PES at which the head is considered off track and all writing of data must stop. The vibration clearly has a significant effect on the PES of the drive.

Figure 3:
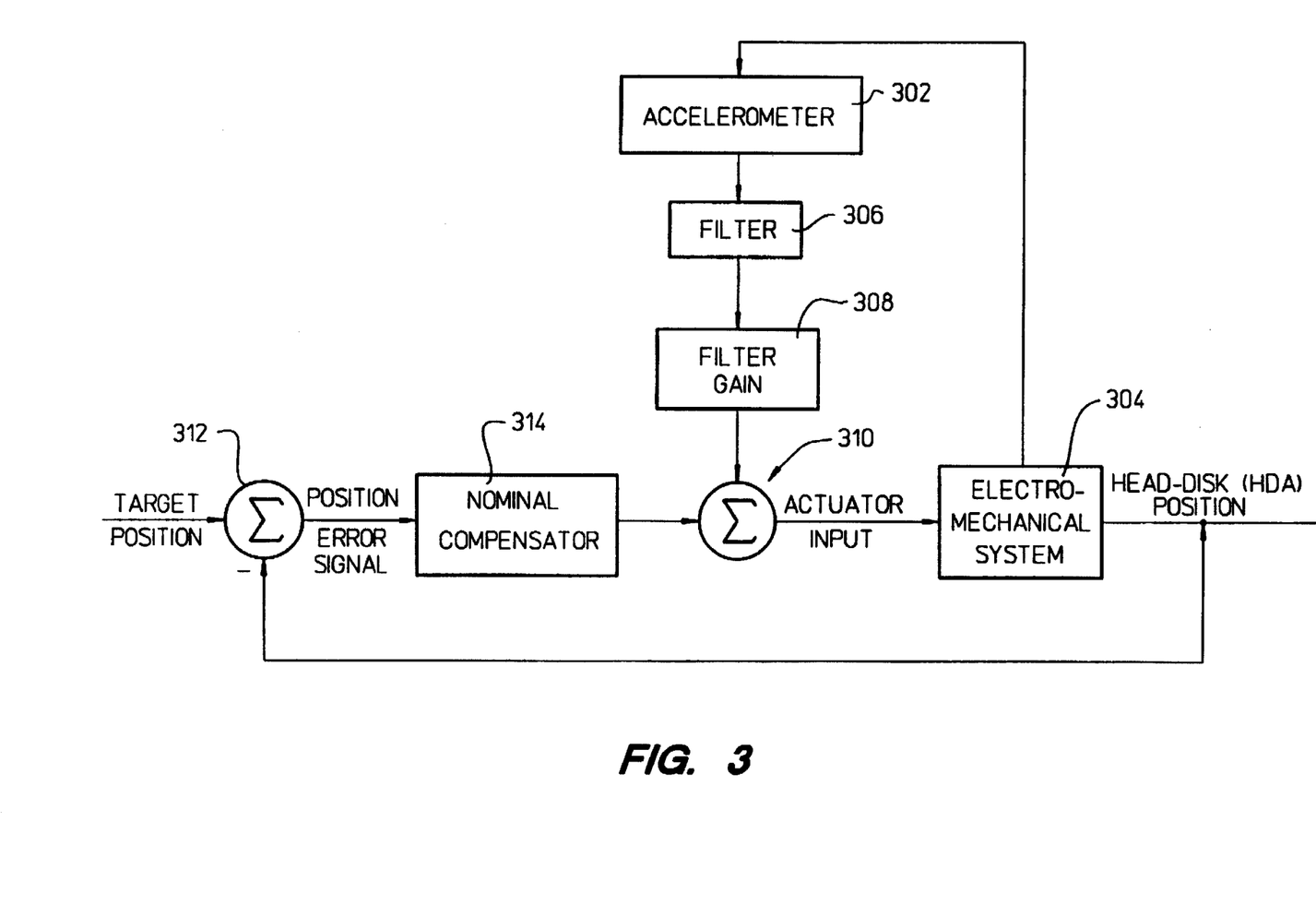
FIG. 3 is a block diagram of Feedforward Cancellation.

FIG. 3 shows a block diagram of the disk drive control loop of this invention. The objective of this invention is to determine a method of using a low cost rotational accelerometer to substantially diminish the effects of rotary shock and vibration on the disk drive control loop. The accelerometer 302 detects rotational vibration of the electromechanical system 304 of the disk drive. The output signal of the accelerometer 302 is filtered by an accelerometer filter 306 and the amplitude of the filtered signal is modified by an accelerometer filter gain block 308. The output of the filter gain block 308 is summed into the actuator control loop at the loop summer 310. The output of the summer 310 drives the actuator of the electro-mechanical system 304. The electro-mechanical system 304 of the disk drive determines the distance of the read/write head at the end of the actuator from the track center on the disk. This distance is subtracted from a target position at summer 312 giving the actual position error signal. The electro-mechanical system block 304 represents all of the moving parts of the system and many of the electrical parts. In general, many signals may be extracted from the electro-mechanical system block 304 and significantly more detail is possible. However, for the purposes here, the electro-mechanical system block 304 can be viewed as a black box wherein only two signals are emanating from it. The first signal is the head position-disk position signal. This, as mentioned above, is used to generate the position error signal (PES). The second signal is the rotary acceleration of the entire head disk assembly. This acceleration is detected by the rotary accelerometer 302. The position error signal is compensated with a nominal compensator 314. The output of the nominal compensator 314 is summed with the output of the filter gain block at the loop summer.

To implement this invention, several difficulties had to be resolved. First, the accelerometers have a self resonance which limits the bandwidth of the signal frequency response of the output of the accelerometer. Secondly, the position information of the disk is interleaved with the user data. The disk drives are physically small and require that the number of position information locations be reduced to preserve disk space for user data. The result is that the sampling rate of the position information is relatively low (a typical sampling rate may be 3717 Hertz). Finally, the low cost accelerometers of this invention have large gain variations of ±50% from unit to unit.

Figure 4A:
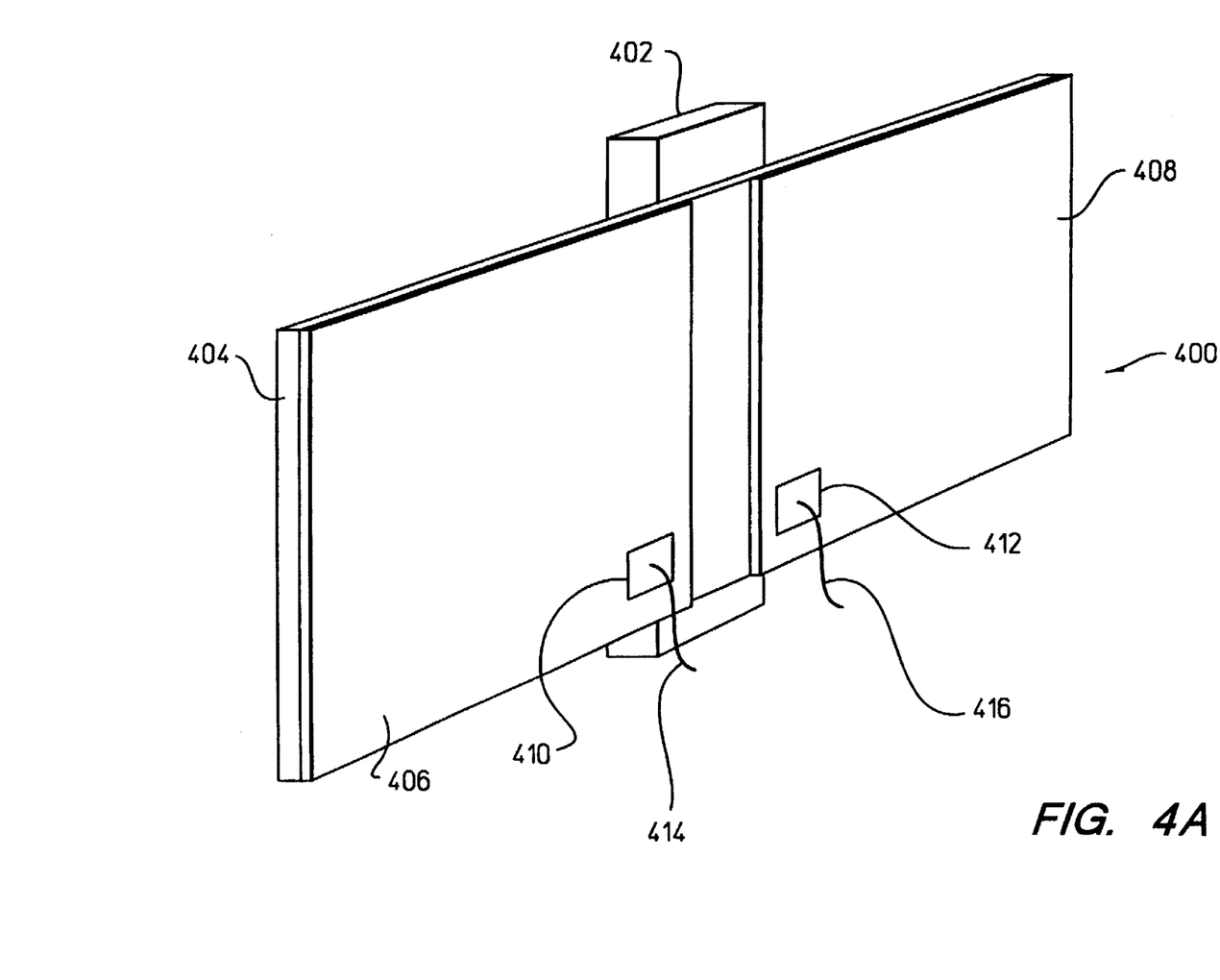
FIG. 4A is a perspective view of a low cost accelerometer.
Figure 4B:
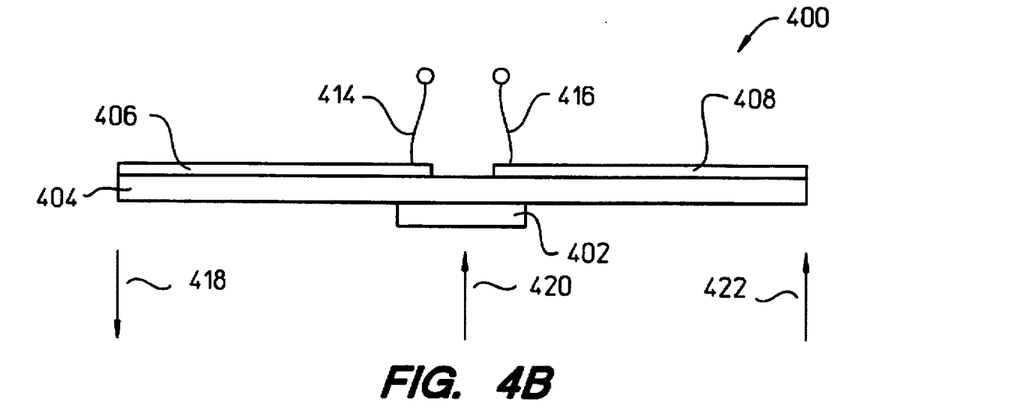
FIG. 4B is a top view of a low cost accelerometer.

FIG. 4A shows perspective view of a low cost rotary accelerometer. The accelerometer 400 has a metallic beam 404 that has two separate pieces of piezoelectric material 406, 408 bonded to it. The beam is mounted on a support post 402 which is normal to the plane of the disk. Thus, the beam flexes in the plane of the disk. The piezo-electric pieces 406, 408 each have a conductive pad 410, 412 on them. Flexing of the beam induces a voltage at either pad 410, 412 where the wires 414, 416 are attached, generating output signals. The signal outputs are differential sensed so that the individual responses to translational motion are cancelled ,while the signal output during rotational motion is boosted. FIG. 4B shows a top view of the accelerometer 400. The arrows 418, 420, 422 depict forces on the accelerometer which will induce an output signal corresponding to the resultant acceleration.

The frequency response of the accelerometer is limited by the first bending mode of the accelerometer beam. The effects of the beam resonance can be minimized by filtering the accelerometer response. However, the required filter is difficult to design at the low sampling rate (3717 Hertz) of the position information. The difficulty is that most filter designs operating at the low sampling rate of the position information will introduce a significant amount of phase lag. It has been determined experimentally that minimizing the phase lag is as critical as having the proper gain setting.

Figure 5:
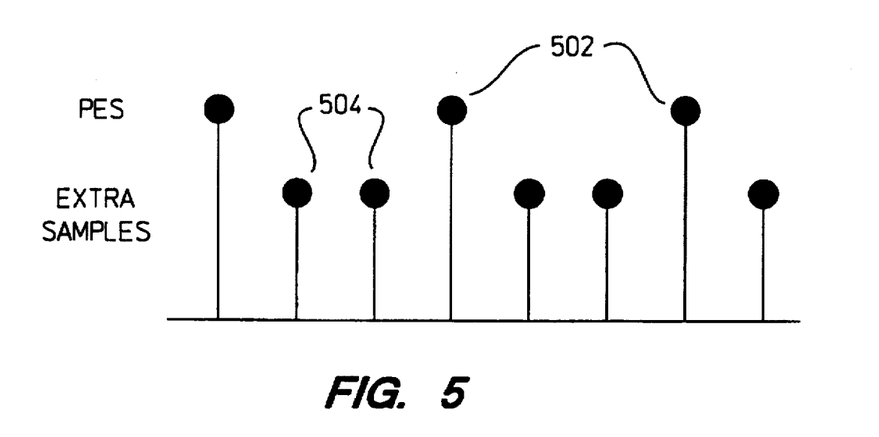
FIG. 5 is a time domain representation of the extra accelerometer samples.

The sampling rate of the head position sensing is limited by the number of position information locations on the disk. However, there is no physical limitation on the sampling rate of the accelerometer. Therefore, a multi-rate sampling scheme can be used. As shown in FIG. 5, the accelerometer signal is sampled when the position error signal is sampled 502, and several time instants in between 504. The extra sampling rate of the accelerometer does not add any overhead to the drive in the sense that it has no adverse effects on how many position samples must be placed around the disk surface. However, the extra samples 504 allow for ease and flexibility in the design of the filtering of the accelerometer response.

The benefits of multi-rate sampling of a disk drive can be demonstrated through the following example. For a disk drive with a head position sampling rate of 3717 Hertz, an accelerometer is mounted on the drive base plate and sampled at four times the nominal (position) sample rate. The higher sampling rate of the accelerometer allows for improved filtering which broadens the bandwidth of the combined response from 2105 Hertz to 2410 Hertz (as measured at the −3 dB point). The phase shift of the filtering is reduced from −30.80° to −23.77° at 300 Hertz. Overall, the higher accelerometer sampling rate allows for more design freedom.

Figure 6A:
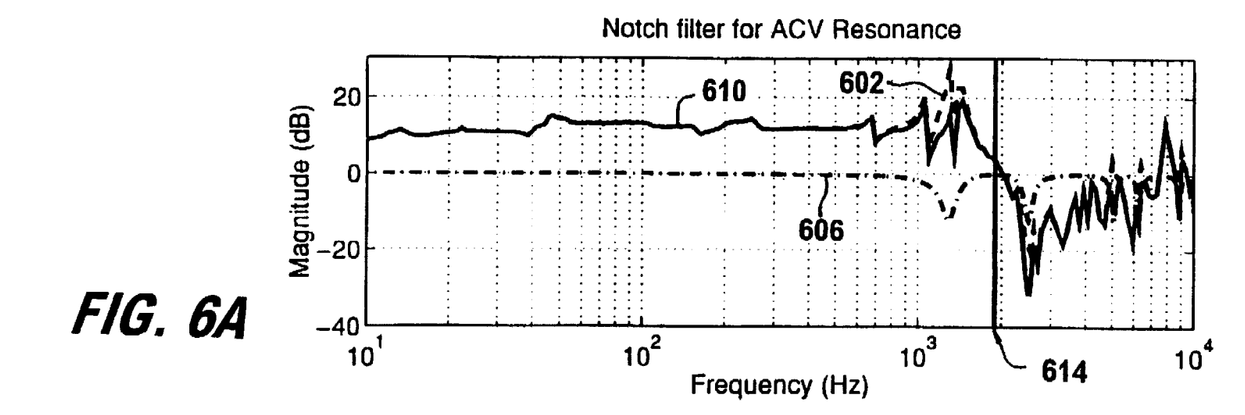
FIGS. 6A and 6B are plots of the frequency response and the phase response of an accelerometer system wherein the accelerometer output is sampled at the same rate as the sectored servo.
Figure 6B:
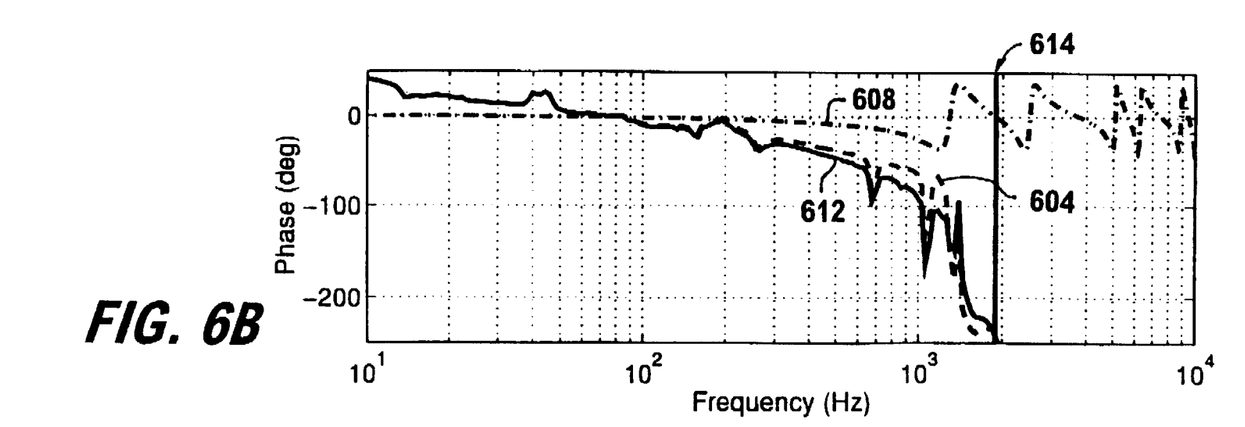
Figure 7A:
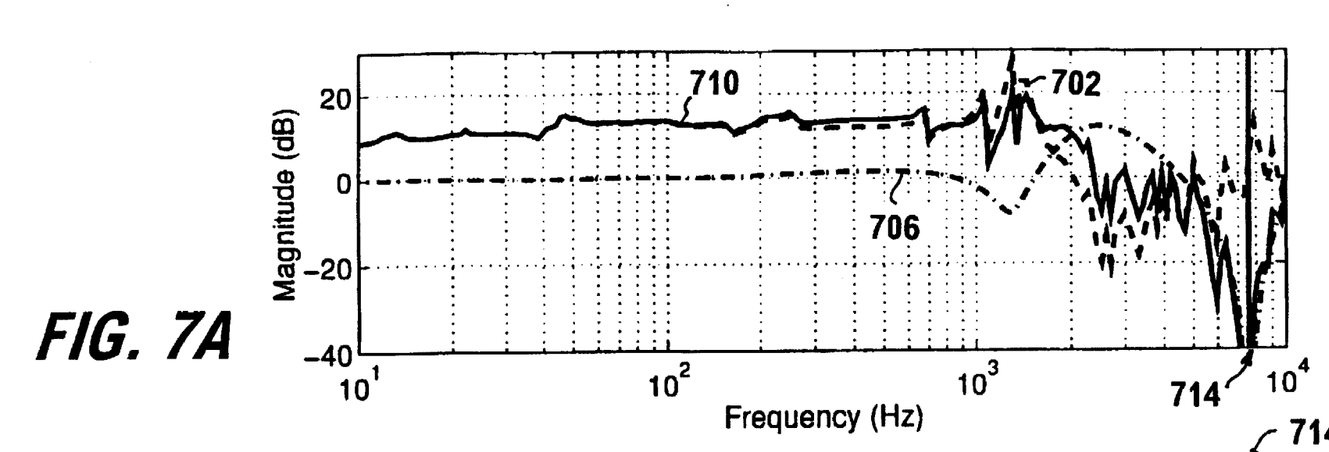
FIGS. 7A and 7B are plots of the frequency response and the phase response of an accelerometer system wherein the accelerometer output is sampled at four times the rate of the sectored servo.
Figure 7B:
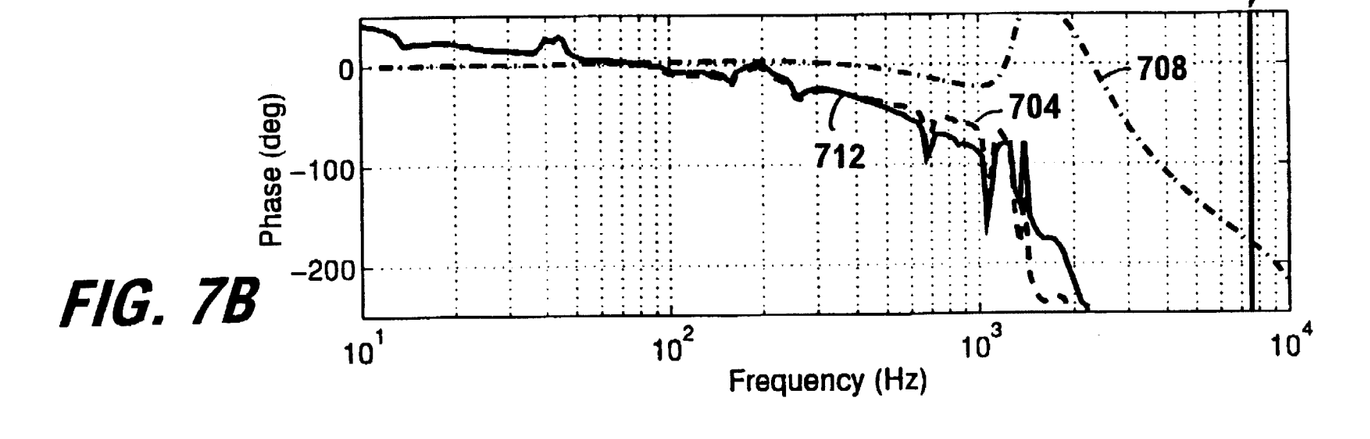

FIGS. 6A shows the frequency response of the magnitude of the accelerometer signal and some filtering when the accelerometer signal is sampled at the same rate as the head position sampling rate (3717 Hertz). FIGS. 6B shows the frequency response of the phase of the accelerometer signal and some filtering when the accelerometer signal is sampled at the same rate as the head position sampling rate (3717 Hertz). Curves 602, 604 represents the accelerometer frequency response. Curves 606, 608 represent the frequency response of the filter. Curves 610, 612 represent the combined frequency response. The vertical solid line 614 shows where the Nyquist frequency of 1858.5 Hertz is located. FIGS. 7A and 7B show the frequency response of the accelerometer signal and filtering when the accelerometer signal is sampled at four times the rate of the head position sampling rate (14,868 Hertz). Curves 702, 704 represents the accelerometer frequency response. Curves 706, 708 represent the frequency response of the filter. Curves 710, 712 represent the combined frequency response. The vertical solid line 714 shows where the Nyquist frequency of 7434 Hertz is located. The signal processing of the accelerometer response signal includes filtering the signal with a notch filter to damp the accelerometer resonance, a low pass filter to roll off the gain above the Nyquist rate, and a phase lead to restore some of the phase lag in the 100 to 600 Hertz range. The filter design at the higher accelerometer sample rate is significantly better because of the design flexibility allowable. The concepts associated with enhancing the characteristics of digital filters by increasing the filter sample rate is well understood in the field of digital signal processing. It is likely that even better filtered accelerometer responses are possible than the one presented here. Note that in comparing FIGS. 6 and 7, it can be observed that the multirate filter of FIG. 7 yields a broader useable bandwidth for the combined response, and less phase lag than the single rate filter of FIG. 6.

Figure 8:
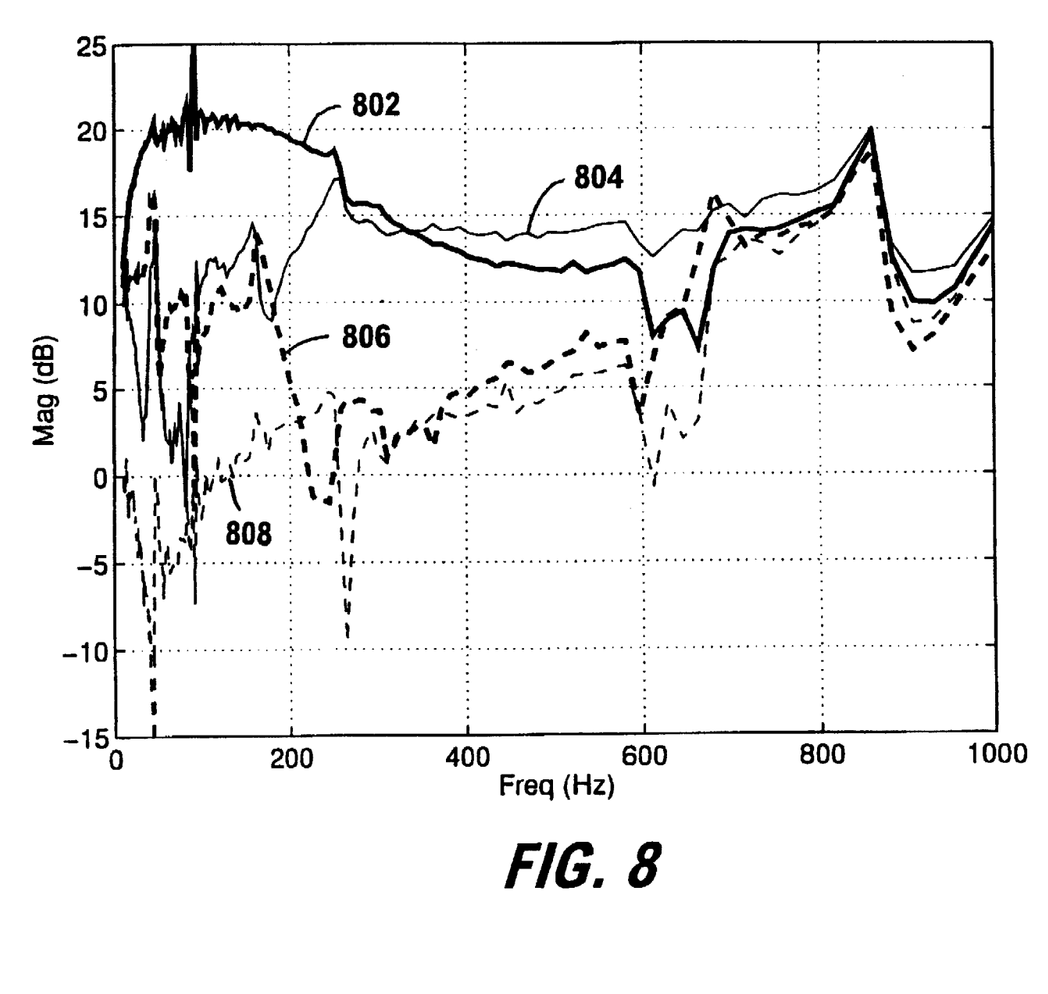
FIG. 8 is a plot comparing the frequency response functions of external disturbances to the PES.

A comparison of frequency response functions of the effects of external disturbance to the position error signal are shown in the plot of FIG. 8. This plot depicts the suppression of the vibration of the HDA for four different configurations. All four responses were generated from the same vibrational source. Each curve represents the frequency response of the ratio between PES and the vibrational disturbance to the HDA. Thus, the more the vibrational frequency is affecting the PES, the greater the magnitude of the curve on the plot. Conversely, the more the external vibrations are suppressed, the lower the magnitude of the curves on the plot of FIG. 8. Curve 802 (the thick solid line) depicts the magnitude of the PES/(vibrational disturbance) when there is no feed forward signal from an accelerometer. Curve 804 (the thin solid line) depicts the PES/(vibrational disturbance) when feed forward from an accelerometer is used in which the accelerometer signal is sampled at the same rate as the PES. Curve 806 (the thick dashed line) depicts the PES/(vibrational disturbance) when the accelerometer signal is sampled at four times the rate of the PES. Finally, curve 808 (the thin dashed line) depicts the PES/(vibrational disturbance) of the HDA when a laboratory grade accelerometer is used instead of a commercial grade accelerometer to generate the accelerometer signal, and the accelerometer signal is sampled at four times the rate of the PES.

Figure 9:
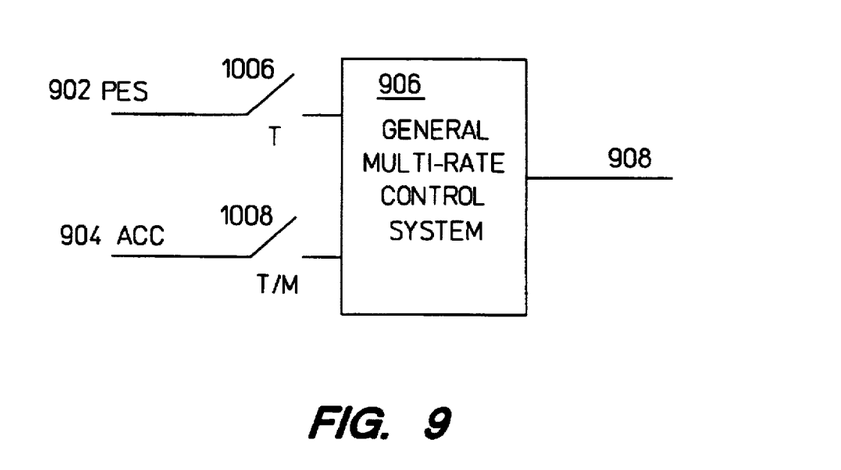
FIG. 9 shows a general block diagram of the compensation structure.

Implementation of the multi-rate HDA position correction is not conceptually difficult. FIG. 9 shows a general block diagram of a multi-rate HDA positioning system. The block diagram depicts the fact that the PES 902 is sampled at a rate 1/T, and the accelerometer output signal (ACC) 904 is sampled at a rate of M/T. M generally represents an integer, but the ACC sampling rate can be less than the PES sampling rate. The multirate control system 906 determines the drive signal 908 to the head actuator. Generally, the output drive signal 908 will be a digital signal output at a rate of M/T.

Figure 10:
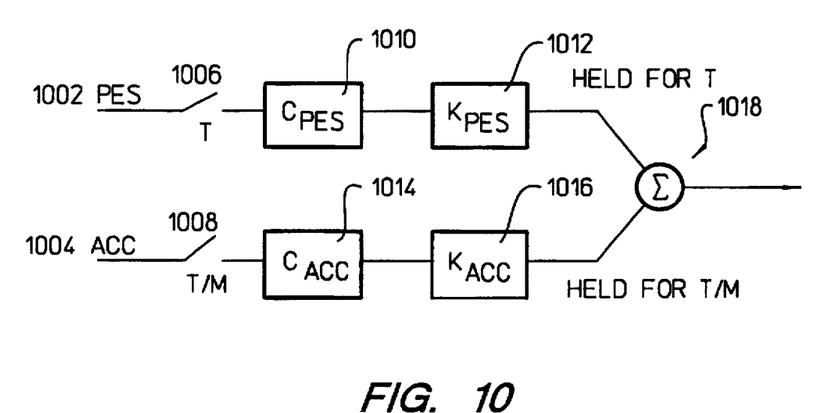
FIG. 10 shows a block diagram of the compensation structure wherein the HDA position error signal and the accelerometer response are filtered separately.

As shown in FIG. 10, the filtering for the PES 1002 and the ACC 1004 can be designed separately. While this simple procedure may not take full advantage of the interrelationship between the PES 1002 and the ACC 1004 signal, it is quite effective and straightforward to program on a digital signal processor (DSP). In the structure shown in FIG. 10, the nominal PES loop is clocked by the disk sector information. The accelerometer loop is clocked by both the disk sector and by an extra clock for the inter-sector samples. In this case, the PES 1002 is sampled by a sampler 1006 at a rate of 1/T and the ACC 1004 is sampled by a sampler 1008 at a rate of M/T. The PES 1002 nominal compensator 1010 and the PES 1002 nominal compensator gain 1012 is separate from the ACC 1004 feed forward filter 1014 and the ACC 1004 gain 1016. The processed responses of both the PES 1002 and the ACC 1004 are combined 1018 to determine the signal sent to the actuator control input (through the D/A converter).

Finally, the issue of using low grade accelerometers which have gain variations of ±50% was addressed. The accelerometer filter gain can be adapted to compensate for the variability of the accelerometer gain. This is possible for this particular accelerometer because despite the fact that the gain of the accelerometers is variable, the frequency response characteristics of the accelerometers is consistent from one unit to the next. This greatly aids in the compensation of the accelerometers because only the variable gain characteristic of the accelerometer must be compensated. Therefore, a single filter design may be used for all accelerometers, and the gain is all that needs to be adapted. Referring to FIG. 10, the gain KACC is adapted while the accelerometer compensator CACC can remain constant.

There are two methods for implementing the adaptation. The first method is to identify the entire accelerometer response. The signals available to process are the PES, the accelerometer signal (ACC) and the signal representing the processed PES and the processed ACC combined. Therefore, this method would require estimating the head disk assembly (HDA) acceleration from the PES signal and the compensator output. This could then be used to form an error signal with the measured ACC signal and the accelerometer could therefore be adapted. A major challenge with this approach is that estimating the HDA accelerations requires evaluating or estimating second derivatives. This technique often requires resolving noise sensitivity issues.

A far simpler method involves understanding the requirements of the system. What is really desired is to remove the effects of HDA acceleration from the PES. The popular Widrow-Hoff least means squared (LMS) algorithm first discussed by B. Widrow and M. E. Hoff, Jr. ("Adaptive switching circuits" IRE WESCON Conv. Rec., pt. 4, pp. 96–104, 1960) and elaborated by B. Widrow and S. D. Stearns (Adaptive Signal Processing. Englewood Cliffs, NJ:Prentice-Hall, 1985) essentially decorrelates signals, and can be used to remove the effects of one signal from the other. An embodiment of this invention extends this method by including an algorithm that sets upper and lower bounds on the values that the gain can be adapted. For example, the gain KACC can be constrained to lie within ±50% of some average or nominal value. This invention also includes logic to ensure that the gain is only adapted if the accelerometer signal is greater than a specified level to ensure that the algorithm is not adapting to a signal that is primarily noise. This situation would occur if the accelerometer is not experiencing any acceleration, and the accelerometer output signal is noise. This method has been experimentally determined to be simple and effective.

The LMS algorithm of this invention includes one equation.

$$w_{k+1} = w_k + 2\mu\epsilon_k x_k$$

Where $\epsilon_k$ is the PES (position error signal), $x_k$ is the ACC (accelerometer signal), $w_k$ is the KACC (at time instant k), $w_{k+1}$ is the KACC (at the time instant k+1) and $\mu$ is the adaptation gain (i.e. a scale factor that determines the speed of the adaptation).

Figure 11:
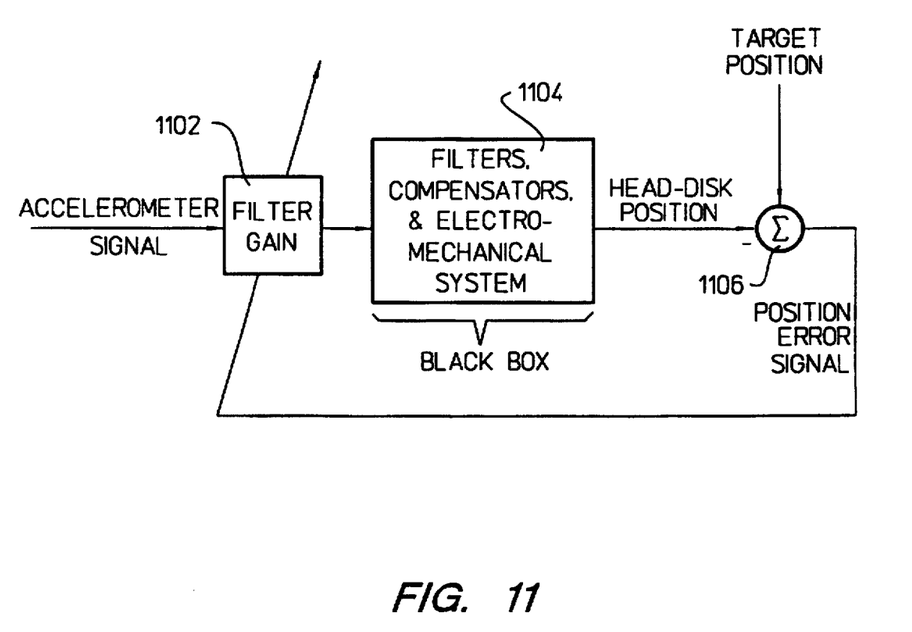
FIG. 11 shows a simplified block diagram of the adaptation.

FIG. 11 shows a simplified block diagram of the adaptation. The accelerometer signal is input to the filter gain section 1102 which filters and varies the loop gain of the compensation loop. The output of the filter gain 1102 sums into the disk drive control loop to help determine the actual positioning of the actuator and thus the transducer relative to the disk position. The disk drive control loop including the loop filters, compensators and the electro-mechanical systems are represented by the black box 1104. The signal representation of the actuator position is compared with the target actuator position at the comparator 1106. Finally, the position error signal generated by the comparator 1106 is used to control the filter gain 1102. With respect to this simplified adaptation block diagram of FIG. 11, the LMS equation can be modified to:

$$(Gain)_{k+1} = (Gain)_k + 2\mu(Error)_k(ACC)_k$$

where ACC is the signal coming from the uncalibrated accelerometer. This algorithm is so simple that it only takes six instructions to program the LMS into a DSP. Four more instructions are required for limiting the upper and lower bounds of the gain. Finally, a six instruction thresholding routine must included to allow adaptation only when the system is experiencing some acceleration. Therefore, an effective and robust adaptation algorithm can be implemented with only sixteen DSP instructions. The adaptation scheme is simple and effective. Therefore, it is reasonable to implement it on a disk drive DSP.

Figure 12A:
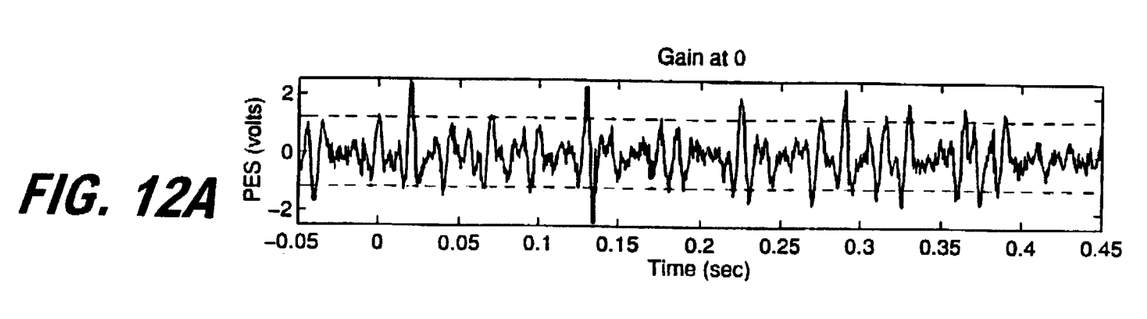
FIGS. 12A, 12B, and 12C show plots of the PES wherein the accelerometer filter gain is at varying stages of adaptation.
Figure 12B:
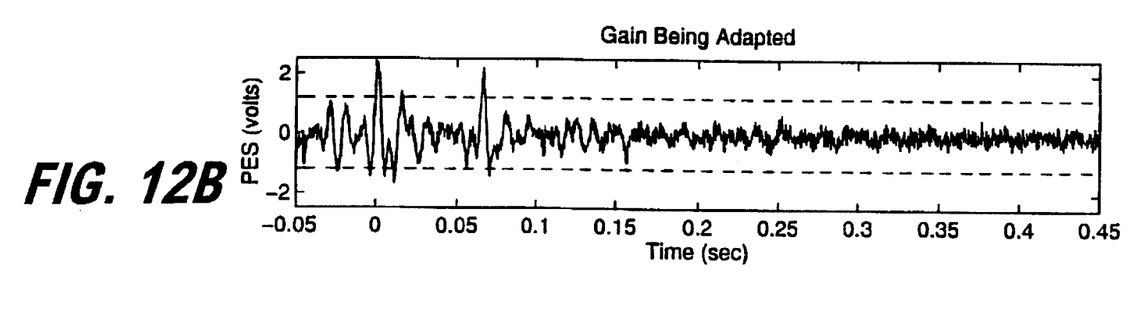
Figure 12C:
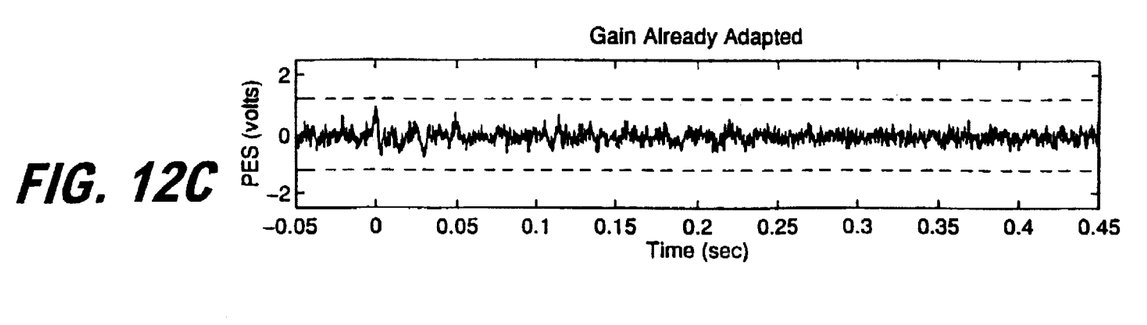

FIGS. 12A, 12B and 12C shows the effective results of the algorithm of this invention. The plots show the PES over a 0.50 second duration of time while the disk drive is subjected to a disturbance of random rotary vibration between 50 and 150 Hertz with a level of 57.7 rad/sec-sec rms. FIG. 12A shows the PES response with the filter gain set to zero. FIG. 12B shows the PES with the accelerometer filter gain being adapted. FIG. 12C shows the PES were the accelerometer filter gain has already been adapted. The PES is significantly reduced with the accelerometer filter gain adapted as shown in FIG. 12C.

As described previously, a thresholding routine is used for the adaptation scheme of this invention. It has been determined that a fairly simple routine of checking the magnitude of the ACC signal with respect to a specified minimum level is enough to keep the accelerometer filter gain from drifting away from its "converged" value. The "converged" value of filter gain is the value the adaptation algorithm sets the filter gain to when a series of rotary shocks occur over a specified period of time. The thresholding routine essentially keeps the accelerometer feed forward loop parameters from drifting between the occurrences of rotary shocks to the disk drive. If the thresholding scheme was not present, then during long period of time in which no rotary shock are experienced, the accelerometer gain will be adapted to the signal noise present at the accelerometer output. If this happens, the accelerometer filter gain may be detuned to the point that when the disk drive does experience a rotary shock, the PES is severely effected.

This invention has been described wherein the disk drive acceleration is detected by an accelerometer. However, any sensor which detects a function of acceleration may be used. For example, a device that detects velocity or changes is acceleration may be used.

The discussions of this invention have been primarily focussed on rotational accelerometers. However, the principals of this invention can be used with linear accelerometers and linear actuators.

I claim:

1. A disk recording/reproducing device, comprising:

a disk rotatably mounted on the device, the disk having a surface containing recording tracks;

a transducer coupled to the surface for producing an output of the position of the transducer with respect to a track;

a moveable actuator connected to the transducer for moving the transducer to different radial locations with respect to the track;

an actuator controller receiving and sampling at a first frequency the output of the transducer for controlling the moveable actuator to maintain the transducer position with respect to the recording track;

a sensor having an output responsive to the acceleration of the device; and an acceleration controller receiving and sampling at a second frequency the output of the sensor for additionally controlling the moveable actuator to further maintain the transducer position with respect to the recording track when the device is being accelerated.

2. The device according to claim 1, wherein the sensor is an accelerometer.

3. The device according to claim 1, wherein the device further comprises a plurality of sensors and a plurality of acceleration controllers for additionally controlling the moveable actuator.

4. The device according to claim 3, wherein the plurality of acceleration controllers sample the plurality of sensors at a plurality of sampling frequencies.

5. The device according to claim 4, wherein the sensors are accelerometers.

6. The device according to claim 4, wherein the device further comprises a plurality of accelerometer signal processors for filtering and adapting the outputs of the sensors before the sensor outputs are received by the plurality of acceleration controllers.

7. The device according to claim 1, wherein the device further comprises an accelerometer signal processor for filtering and adapting the output of the sensor before the sensor output is received by the acceleration controller.

8. The device according to claim 7, wherein the device further comprises a threshold detector for determining when a function of the output of the sensor is below a predetermined value and turning the adaptation of the accelerometer signal processor off.

9. A method of maintaining a transducer position with respect to a recording track in a disk recording/reproducing device having a rotatable mounted disk having a surface containing recording tracks, a transducer coupled to the surface for producing an output with respect to the position of the tracks, a moveable actuator connected to the transducer for moving the transducer to different radial locations with respect to the recording tracks, a sensor having an output responsive to the acceleration of the device, the method comprising the steps of:

a. sampling the transducer output at a first frequency and processing the sampled output in an actuator controller for controlling the moveable actuator which maintains the transducer position with respect to the recording track;

b. sampling the sensor output at a second frequency and processing the sampled output with an acceleration controller for additionally controlling the moveable actuator which further maintains the transducer position with respect to the recording track.

10. The method according to claim 9, further comprising;

c. sampling a plurality of sensors outputs at a plurality of sampling frequency and processing the plurality of sampled outputs with a plurality of acceleration controllers for additionally controlling the moveable actuator which further maintains the transducer position with respect to the recording track.

* * * * *